(12) United States Patent
Krstulich et al.

(10) Patent No.: US 8,369,339 B2
(45) Date of Patent: Feb. 5, 2013

(54) SYSTEM AND METHOD OF SUBSCRIBER TO CONTENT PROVIDER NETWORK ACCESS SERVICE MANAGEMENT

(75) Inventors: Zlatko Krstulich, Ottawa (CA); Bashar Said Bou-Diab, Ottawa (CA)

(73) Assignee: Alcatel Lucent, Paris (FR)

( * ) Notice: Subject to any disclaimer, the term of this patent is extended or adjusted under 35 U.S.C. 154(b) by 1252 days.

(21) Appl. No.: 11/654,615

(22) Filed: Jan. 18, 2007

(65) Prior Publication Data

US 2008/0175255 A1   Jul. 24, 2008

(51) Int. Cl.
*H04L 12/66* (2006.01)
*H04L 12/28* (2006.01)
*H04J 1/00* (2006.01)

(52) U.S. Cl. .............. 370/395.21; 370/352; 370/401; 370/420; 370/485

(58) Field of Classification Search .............. None
See application file for complete search history.

(56) References Cited

U.S. PATENT DOCUMENTS

| 7,142,530 | B1* | 11/2006 | Chewning et al. | 370/351 |
| 2003/0187974 | A1* | 10/2003 | Burbeck et al. | 709/224 |
| 2005/0286535 | A1* | 12/2005 | Shrum et al. | 370/395.21 |
| 2006/0050862 | A1* | 3/2006 | Shen et al. | 379/219 |
| 2006/0072541 | A1* | 4/2006 | Pecus | 370/351 |
| 2007/0195818 | A1* | 8/2007 | Stephenson et al. | 370/468 |
| 2008/0159159 | A1* | 7/2008 | Weinman | 370/252 |

* cited by examiner

*Primary Examiner* — John Blanton
*Assistant Examiner* — Thinh Tran
(74) *Attorney, Agent, or Firm* — Kramer & Amado P.C.

(57) ABSTRACT

A system and method are provided for subscriber to content provider network access service management which is requested by and paid for by the content provider to the network access provider. In response to the request from the content provider the network access provider invokes changes in bandwidth and/or quality of service for network traffic traversing between the web service provided by the content provider and the subscriber, either automatically or in response to a run-time request. The changes made in bandwidth and/or quality of service for the network traffic enables more robust and timely content and applications to be delivered to the specific subscriber from the content provider.

28 Claims, 2 Drawing Sheets

SYSTEM AND METHOD OF SUBSCRIBER TO CONTENT PROVIDER NETWORK ACCESS SERVICE MANAGEMENT

FIELD OF THE INVENTION

The invention relates to managing subscriber network access and more particularly to the management of bandwidth and quality of service of a subscriber's network access service to specific content provider web content or services.

BACKGROUND OF THE INVENTION

Organizations offering products and or services are increasingly dependent upon the online dimension of their businesses. The internet is increasingly being used by consumers to shop online and to perform product or service pre-purchase research. It has been found that the online experience of a consumer with an organization is highly correlated with their online and offline purchases and future business in general with that organization. It also has been found that slower access speeds during online shopping is correlated with more abandoned online shopping carts, and fewer returning online shoppers. Value added functions such as streaming video and interactive help also suffer if access speeds are low. To maintain their market share and to keep pace with the competition, organizations rely on a low latency and robust online presence to advertise their products and or services, provide information to potential customers, provide support functions to existing customers, and to conduct business transactions.

In addition to the web content provided to consumers for the purpose of online shopping and providing information and support in respect of products, some organizations deliver purely digital products or services over the internet such as music, streaming videos, software, and movies. These market sectors are growing, and as the quality and size of deliverables grow so does the corresponding bandwidth and the potential that delivery of those deliverables will be impaired. Some purely digital products and services are time sensitive or real-time in nature requiring instant or very fast interaction between the customer and the service. Some of these time sensitive interactive services include online applications, and multiplayer gaming. Low bandwidth and high latency cause delays in sending and receiving data which reduces responsiveness of the service, creating frustration and destroying the experience of interactivity.

Internet service subscribers have access to the internet over an access connection provided by a network access provider (NAP). The quality of service and bandwidth are determined based on the level of service the subscriber and the network access provider have agreed to. Typically, subscribers pay a monthly charge which is primarily determined from the bandwidth and speed of access, in which higher bandwidth and speed of access demands a higher monthly fee.

Consumers which have not subscribed to an NAP for internet access may have latent internet access facilities in their residences which are capable of accessing the internet but are not engaged to do so. This situation will be increasingly common as consumers subscribe to services such as VoIP and IPTV, which bring broadband facilities (including modems and residential Gateways) into their homes for reasons other than internet access services.

Currently, an organization's ability to provide web services to a customer or potential customer who is an internet service subscriber is limited by the subscriber's access capabilities as agreed to between the subscriber and the NAP. If a subscriber has a bandwidth limited connection through the NAP then the subscriber's online experiences of online services in connection with the organization will also be limited. Organizations currently can ask users to 'self characterize' their access type to better match and adapt the delivery of content to the capability of the access link; for example providing the choice between viewing high bandwidth and low bandwidth websites, and providing the choice between high bandwidth and low bandwidth online services. They also may have had the option of using content delivery networks (CND) such as an edge delivery service (EDS) which speeds up delivery of content to end users by maintaining a copy of web content closer to the domain of the end user, reducing inter-domain internet bottlenecks. This option does not address the bottleneck in place due to the agreement between the NAP and the subscriber, and located in the access and aggregation network segments that physically connect the subscriber to the internet.

SUMMARY OF THE INVENTION

According to one broad aspect, the invention provides for a system for managing network service to subscriber premises equipment, the system comprising: a service management system for receiving a service request from a content provider system of a content provider, and for generating service management commands with use of said service request, said service request requesting as a service, an improvement in network service to said subscriber premises; a network management system (NMS) coupled to said service management system and responsive to said service management commands received from said service management system to generate network management commands; and network access provider (NAP) infrastructure providing said network service to said subscriber premises equipment and coupled to said NMS and responsive to said network management commands received from said NMS to change network transport parameters for implementing said improvement in said network service to said subscriber premises equipment, wherein said content provider is charged for said improving of said network service to said subscriber premises equipment.

In some embodiments of the invention, said service request is generated by said content provider with use of a service description from said NAP.

In some embodiments of the invention, said service description comprises a set of parameters defined for at least one IP address range for which said service is provided, each set of parameters comprising: a respective class of service (CoS) definition having at least one attribute selected from access BW levels, shaping levels, best effort levels, and expedited forwarding levels; and respective filtering criteria defining which traffic said improvement applies to based on destination or source addresses of one of layer 3 and HTTP.

In some embodiments of the invention, said service description further comprises information defining content provider authorization methods, billing methods, and service API parameters.

In some embodiments of the invention, said service description is provided to said content provider by being published in at least one of a private web services registry and a public web services registry.

In some embodiments of the invention, said web services registries are UDDI web service databases, said service description is a WSDL service description, said content provider finds said service description in said UDDI web service databases, and said service description comprises binding details to locate, contact, and invoke said service.

In some embodiments of the invention, said service description is provided to said content provider by being published directly to said content provider.

In some embodiments of the invention, said service request is an invocation of said service which is described in said service description.

In some embodiments of the invention, said service request is sent real-time in response to said content provider system detecting access by said subscriber premises equipment of said web service.

In some embodiments of the invention, said service management commands direct said NMS to increase bandwidth afforded to said subscriber premises equipment by sending to said NAP infrastructure network management commands to increase said bandwidth.

In some embodiments of the invention, said service management commands direct said NMS to increase a quality of service afforded to traffic traversing to and from said subscriber premises equipment by sending to said NAP infrastructure said network management commands to increase said quality of service.

In some embodiments of the invention said subscriber premises equipment comprises latent internet access facilities and said service management commands direct said NMS to provide internet access to said subscriber premises equipment by sending to said NAP infrastructure said network management commands to allow traffic to traverse between the internet and said subscriber premises equipment.

In some embodiments of the invention, said service management commands direct said increase in bandwidth of service to traffic traversing between said subscriber premises equipment and a web service of said content provider, and wherein said NMS is responsive to said service management commands to increase said bandwidth of service to traffic traversing between said subscriber premises equipment and said web service.

In some embodiments of the invention, said service management commands direct said increase in quality of service to traffic traversing between said subscriber premises equipment and a web service of said content provider, and wherein said NMS is responsive to said service management commands to increase said quality of service to traffic traversing between said subscriber premises equipment and said web service.

In some embodiments of the invention, said NAP infrastructure further comprises: a traffic conditioner for controlling a shaping and policing of traffic to and from said subscriber premises equipment, wherein said traffic conditioner is responsive to said network management commands to increase said bandwidth of service to traffic traversing between said subscriber premises equipment and said web service by accordingly controlling a shaping and policing of traffic to and from said subscriber premises equipment.

In some embodiments of the invention, said service request comprises directives specifying at least one of a magnitude, a type, and a duration for the change in network transport parameters for improving said network service to said subscriber premises equipment.

In some embodiments of the invention, said service management commands specify at least one of a magnitude, a type, and a duration for the change in network transport parameters for improving said network service to said subscriber premises equipment.

According to another broad aspect, the invention provides for a method for managing network service to subscriber premises equipment, the method comprising: receiving at a service management system a service request from a content provider system of a content provider, said service request requesting as a service an improvement in network service to said subscriber premises; generating service management commands with use of said service request; sending said service management commands from said service management system to a network system manager (NMS); generating network management commands at said NMS with use of said service management commands; sending said network management commands from said NMS to network access provider (NAP) infrastructure providing said network service to said subscriber premises equipment; changing at said NAP infrastructure network transport parameters for improving said network service to said subscriber premises equipment in response to said NAP infrastructure receiving said network management commands from said NMS; and charging said content provider for said improving of said network service to said subscriber premises equipment.

Some embodiments of the invention further provide for providing to said content provider said service description by publishing said service description in at least one of a private web services registry and a public web services registry.

Some embodiments of the invention further provide for providing to said content provider said service description by publishing said service description directly to said content provider.

In some embodiments of the invention, said service request is an invocation of a service described in said service description.

Some embodiments of the invention further provide for increasing by said NAP infrastructure bandwidth afforded to said subscriber premises equipment in response to said network management commands.

Some embodiments of the invention further provide for increasing by said NAP infrastructure a quality of service afforded to traffic traversing to and from said subscriber premises equipment in response to said network management commands.

Some embodiments of the invention in which said subscriber premises equipment comprises latent internet access facilities, further provide for providing internet access by said NMS to said subscriber premises equipment by sending to said NAP infrastructure said network management commands to allow traffic to traverse between the internet and said subscriber premises equipment.

In some embodiments of the invention, said increasing of bandwidth afforded to said subscriber premises is performed for traffic traversing between said subscriber premises equipment and a web service of said content provider.

In some embodiments of the invention, said increasing of quality of service afforded to traffic traversing to and from said subscriber premises equipment is performed for traffic traversing between said subscriber premises equipment and a web service of said content provider.

In some embodiments of the invention, changing network transport parameters comprises shaping and policing of traffic to and from said subscriber premises equipment in response to said network management commands to increase said bandwidth of service to traffic traversing between said subscriber premises equipment and said web service.

BRIEF DESCRIPTION OF THE DRAWINGS

The features and advantages of the invention will become more apparent from the following detailed description of the preferred embodiments with reference to the attached figures, wherein.

It is noted that in the attached figures, like features bear similar labels.

DETAILED DESCRIPTION OF THE PREFERRED EMBODIMENTS

Figure 1:
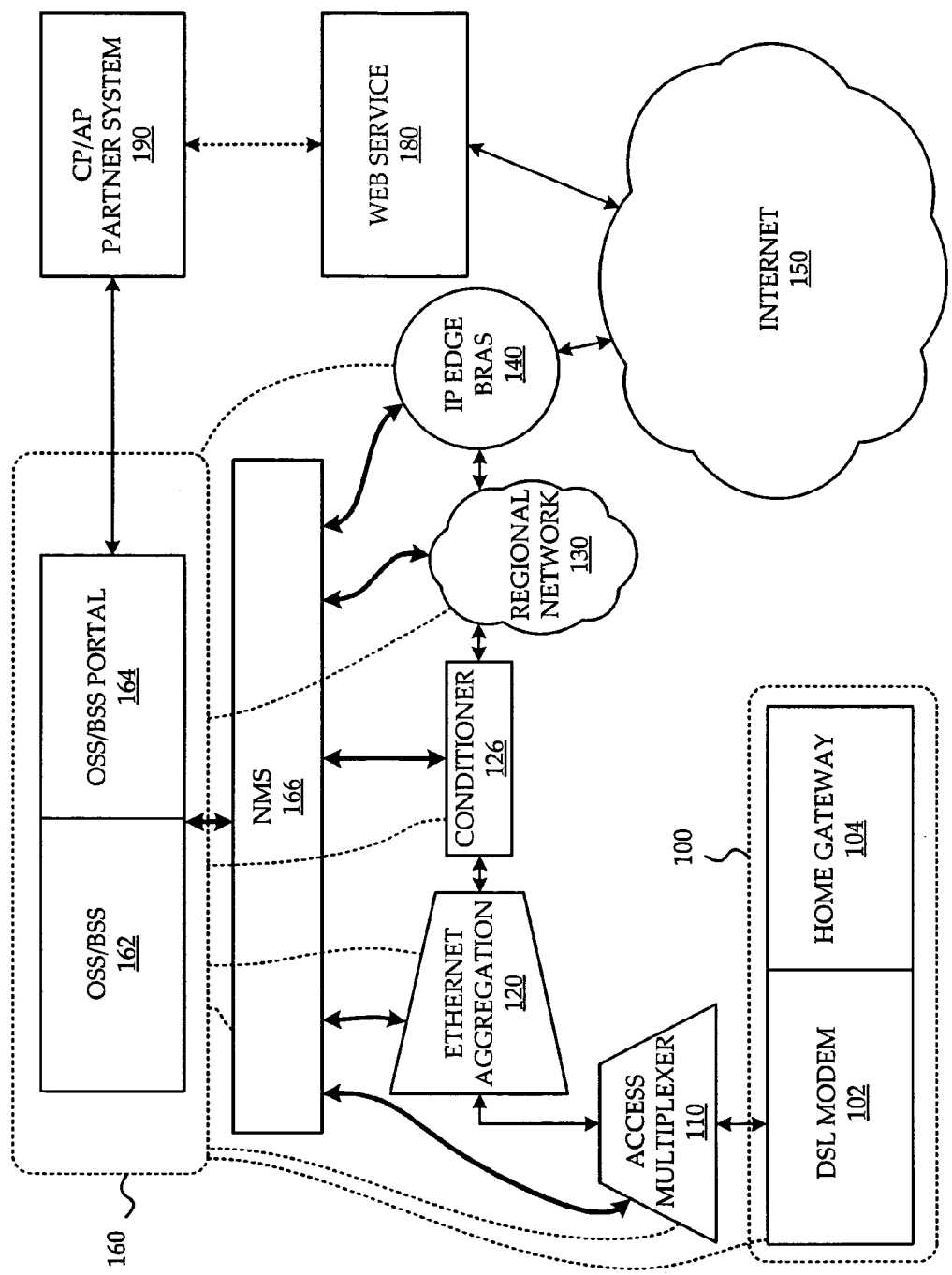
FIG. 1 is a block diagram illustrating a system for management of bandwidth and quality of service for subscriber network access to a content provider according to the preferred embodiment.

A system for management of bandwidth and quality of service for subscriber network access to a content provider according to the preferred embodiment is now described with reference to FIG. 1. This management mechanism allows for content providers to pay for extra bandwidth/quality of service for a subscriber accessing their web content.

A content/application provider's (CP/AP) system 190 has a web service 180 connected to the Internet 150 for providing web content or applications to subscriber premises equipment (SPE) 100 connected to the Internet 150 via a NAP infrastructure. The SPE 100 includes a DSL modem 102 and a home gateway 104 as part of its access equipment. The gateway 104 could for example be a software firewall or other security system situated between the DSL modem 102 and the subscriber's computer or home network (not shown). The NAP infrastructure has elements which connect the subscriber premises equipment 100 to the Internet 150 including an access multiplexer 110 (which could be a DSL access multiplexer or DSLAM) coupled to the SPE 100, an Ethernet aggregation network 120 coupled after the access multiplexer 110, a conditioner 126 between the Ethernet aggregation network 120 and a regional network 130 of the NAP, and an IP edge BRAS 140 coupling the regional network 130 to the Internet 150. Each of the NAP infrastructure elements are controlled by a network management system (NMS) 166 which in turn can be directed by an operational support system/business support system (OSS/BSS) 162. The OSS/BSS 162 has an OSS/BSS portal 164 for access by the CP/AP system 190. The OSS/BSS 162 is capable of controlling the characteristics of the NAP infrastructure elements 110, 120, 126, 130, 140, and the modem 102 through the NMS 166. The OSS/BSS 162 and the OSS/BSS portal 164 make up a service management system 160 for managing the subscriber bandwidth and quality of network access. The service management system 160 oversees the subscriber's access service which is represented in FIG. 1 as dashed lines leading from the service management system 160 to each of the NAP infrastructure elements, and to the NMS 166 which controls the NAP infrastructure elements.

Access service management according to the preferred embodiment is now described in terms of two main functions, management of actual IP service to the SPE 100, and change or invocation of management in partnership with the CP/AP system 190.

With respect to the actual IP service to the SPE 100, the modem 102 and each of the elements 110, 120, 126, 130, 140 of the NAP infrastructure between the SPE 100 and the Internet 150 may be controlled by the NMS 166, in response to directives from the service management system 160 to change the bandwidth or packet priority/quality of the traffic to and from the SPE 100. Altering the connection speed to the SPE 100 involves changing bandwidth settings at one or more nodes on the data-path between the SPE 100 and the Internet 150. These changes are made along each of the segments where needed to enable the desired change in speed, such as the access segment of which the access multiplexer 110 and modem 102 are a part, the Ethernet aggregation segment of which Ethernet aggregation network 120 is a part, and the IP aggregation segment of which the IP edge BRAS 140 is a part, as well as within the regional network 130 itself. Depending upon the access and aggregation network architecture, the connection to the SPE 100 may be rate limited by one or more nodes in these segments of the NAP infrastructure. An example mechanism of rate limiting is that of a shaper/rater and policer of the conditioner 126 between the Ethernet aggregation network 120 and the regional network and another conditioner (not shown) possibly at the BRAS 140 and may involve changing the sync rate between a DSL modem 102 and a DSLAM such as the access multiplexer 110. The shaper would limit the rate of traffic downloaded to the SPE 100 while the policer would limit the rate of traffic uploaded from the SPE 100. Although the conditioner 126 has been shown specifically to reside between the Ethernet aggregation network 120 and the regional network 130, it may reside anywhere amongst the NAP infrastructure for providing network service to the subscriber.

Management typically involves an increase in access speed/bandwidth once it has been determined that a subscriber is to receive such an increase. The access speeds/bandwidth could be increased in the general sense for the SPE 100, in which case any connection to the Internet would benefit, however, preferably a limiter/rater allows additional bandwidth only for particular packets. These particular packets could be determined by a classifier part of the conditioner 126 and may utilize DPI (deep packet inspection) and chosen based on an IP address or other identification in their headers. These particular packets preferably would be IP packets traversing between the web service 180 and the SPE 100. In this manner only web content and/or application performance of the web service 180 associated with the CP/AP system 190 sees an improvement in bandwidth.

Using dynamically configurable packet classification the network access service between the SPE 100 from the web service 180 could be improved by prioritizing the IP traffic therebetween. If logical pipes are being used for the IP packets, extra logical pipes could be set up for the connection. Both upstream policing and downstream shaping and prioritization could be used, specifically targeting traffic between the SPE 100 and the web service 180.

Executing the management of the network access involves executing logic at a combination of multiple management layers, such as the OSS/BSS layer, the business level management layer, the service management layer, the network management layer, and the element data-path layer on multiple systems.

Change or invocation of management of the network access service occurs in tandem with the CP/AP partner system 190 to which the web service 180 belongs.

At any time prior to the management of the network access service to the subscriber, the CP/AP system 190 and the NAP exchange messages to set-up the management service with the OSS/BSS 162. This message exchange occurs through the OSS/BSS portal 164 and includes the exchange of Service Descriptions which are encoded preferably in WSDL (web services description language). The mechanism for exchange through the OSS/BSS portal 164 could include e-mail or UDDI (Universal Description Discovery and Integration) in a web services architecture.

Figures 2, 3:
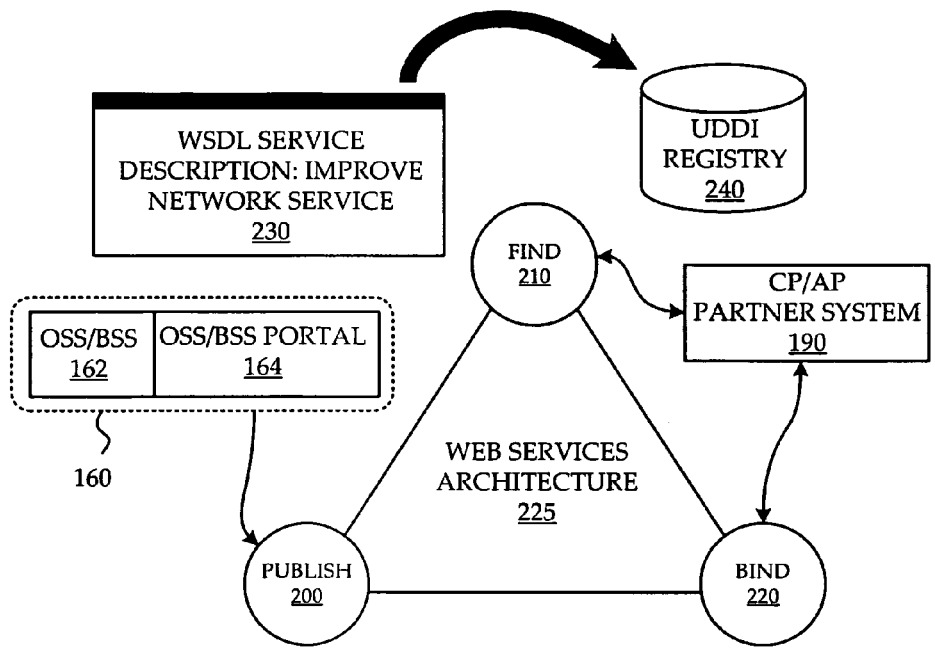
FIG. 2 is a block diagram illustrating an example web services architecture for the system for management of bandwidth and quality of service depicted in FIG. 1.
FIG. 3 is a block diagram illustrating an example service description for use in the system for management of bandwidth and quality of service depicted in FIG. 1.

In a preferred embodiment depicted in FIG. 2, the known publish-find-bind architecture 225 is used to allow use of the management by the CP/AP system 190 as a service. The service description 230 could be published 200 by the service management system 160 in a public or private UDDI service registry database 240. An CP/AP system 190, being the service requestor which could call on the management service, would first need to find 210 the management service in the UDDI registry 240, either at run-time or sometime beforehand if a subscription arrangement is preferred. Once the service description 230 is found by the CP/AP system all of the necessary binding details to locate, contact, and invoke the service become known to the CP/AP system 190, which is referred to as binding 220 to the service. In this way the CP/AP system 190 of the preferred embodiment has the necessary information to enable it to invoke the service through the OSS/BSS portal 164.

The service descriptions in WDSL include different kinds of information for configuring the nature and conditions for the management of network access services to the subscriber. Example information contained in a WSDL service description 230 for improving network service is depicted in FIG. 3. The service description may be arranged by IP address ranges for example IP Range1 231A and IP Range2 232A may be included to define respective groupings of parameters 231, 232 for services provided for respective ranges 231A, 232B of IP addresses. A CoS (Class of Service) for each IP address range is defined (CoS1 231B and Cos2 231B for example), each CoS having attributes such as access BW (bandwidth) policing/shaping levels, best effort, assured, and expedited forwarding levels. For each CoS setting, a price may be specified along with a pricing formula (fixed or permanent). For each range of IP addresses filtering criteria 231C, 232C may be set. This allows the CP/AP to specify which traffic the changes must apply for, for example the packets could be filtered on source or address destination addresses in layer 3 or HTTP. Further the service description would list billing methods 237 acceptable to the NAP, and authorization methods 238 for the NAP to authorize the CP/AP 190. Finally, an indication of the Service API parameters 239 required to invoke the services is present, and may include the duration of service implementation.

The particular set-up between the CP/AP system and the NAP may take on many forms.

In one case, all subscribers are set to receive the same increase in service when communicating with the web service 180 of the CP/AP system 190, and the service is invoked automatically with no additional communication with the CP/AP system 190. In this case when the subscriber connects over the internet 150 to access the web service 180, the service management system 160 commands the NMS 166 to set up a better network access connection between the subscriber premises equipment 100 and the Internet 150.

In another case the NAP does not invoke the service until the CP/AP system 190 makes a request in respect of a specific subscriber accessing the CP/AP web service 180. In this case the CP/AP system 190 performs DPI on the packets exchanged in respect of the web server and extracts the IP address which it then uses to invoke the management service by sending a management service request to the OSS/BSS portal 164 containing the IP address of the subscriber. In this embodiment the CP/AP system 190 can request a different level of increase of network service for the subscriber based on the activity of the subscriber. For example, timely interactivity with a help function may require a different magnitude and type of network service change than viewing a streaming high-definition video file would.

In another case, the NAP detects the connection to the web service 180 and sends a service offer to the CP/AP system 190 which in turn decides whether the connection, subscriber, particular service or some combination of these and other factors warrants an increase in subscriber access service.

In all cases, the CP/AP would pay for the invocation and utilization of the NAP's network to provide the extra bandwidth and/or quality of network access according to their billing agreement and the acceptable billing methods stipulated in the service description.

The end result of an invocation of the management service is the increase in bandwidth or network access quality for the subscriber utilizing the web service 180 of the CP/AP.

For consumers with latent internet access facilities, the embodiment could be used to enable internet access over these pre-existing facilities without charge to the subscriber. In such a case the consumer is a subscriber to the NAP for purposes other than internet access, such as a subscriber to VoIP and IPTV. Here, the improvement to the network access of the subscriber is the addition of internet access, which would be paid for by the content provider wishing to market to the consumer. The economic obstacle for internet use would thereby be removed.

In the case of online shopping, the overall experience of browsing products and accessing enhanced associated content is improved, leading to a better impression of the organization's business and services, and to fewer abandoned shopping carts.

In the case of delivery of digital online services such as music, movies, and internet gaming, the all around quality of the product offered by the organization is directly improved. Higher bandwidth content maybe delivered in the form of streaming media, and downloadable content can be delivered faster to the customer. In the case of gaming or time sensitive/real-time applications, higher bandwidth and prioritization of packets leads to lower latency of interaction with the application and the servers and other participants involved.

It should be understood that although in the preferred embodiment the access segment portion of the SPE 100 has been shown to be a DSL modem 102, other embodiments may utilize other types of access such as but not limited to cable, satellite, CDMA, and optical access.

The embodiments presented are exemplary only and persons skilled in the art would appreciate that variations to the embodiments described above may be made without departing from the spirit of the invention. The scope of the invention is solely defined by the appended claims.

We claim:

1. A system for managing network service to subscriber premises equipment associated with at least one subscriber, the system comprising:
    a service management system for:
        providing, to a content provider, at least one service description for improving service of the at least one subscriber comprising:
            at least one set of parameters defined for at least one IP address range for which said service is provided comprising a respective class of service (CoS) definition having at least one attribute selected from access BW levels, shaping levels, best effort levels, and expedited forwarding levels, content provider authorization methods, billing methods, and service API parameters; and
            respective filtering criteria defining which traffic said improvement applies to based on destination or source addresses of one of layer 3 and HTTP;

receiving a service request from a content provider system of said content provider, and generating service management commands with use of said service request, said service request requesting as a service, an improvement in network service to said subscriber premises equipment;

a network management system (NMS) coupled to said service management system for responding to said service management commands received from said service management system and generating network management commands; and a network access provider (NAP) infrastructure coupled to the NMS for providing said network service to said subscriber premises equipment, responding to said network management commands received from said NMS to change network transport parameters to increase one of at least bandwidth and quality of network access of the at least one subscriber, and implementing said improvement in said network service to said subscriber premises equipment, wherein said service request is generated by said content provider for the at least one subscriber based on the service description received from said service management system, and said content provider is charged for said improvement in said network service to said subscriber premises equipment.

2. The system of claim 1, wherein said service description is published in at least one of a private web services registry and a public web services registry.

3. The system of claim 2, wherein said web services registries are UDDI web service databases, said service description is a WSDL service description, said content provider finds said service description in said UDDI web service databases, and said service description comprises binding details to locate, contact, and invoke said service.

4. The system of claim 1, wherein said service description is provided to said content provider by being published directly to said content provider.

5. The system of claim 1, wherein said service request is an invocation of said service which is described in said service description.

6. The system claim 5, wherein said service request is sent in real-time in response to said content provider system detecting access by said subscriber premises equipment of said web service.

7. The system of claim 1, wherein said service management commands direct said NMS to increase bandwidth afforded to said subscriber premises equipment by sending, to said NAP infrastructure, said network management commands to increase said bandwidth.

8. The system of claim 7, wherein said service management commands direct said increase in bandwidth of service to traffic traversing between said subscriber premises equipment and a web service of said content provider, and wherein said NMS is responsive to said service management commands to increase said bandwidth of service to traffic traversing between said subscriber premises equipment and said web service.

9. The system of claim 8, wherein said NAP infrastructure further comprises:

a traffic conditioner for controlling a shaping and a policing of traffic to and from said subscriber premises equipment, wherein said traffic conditioner is responsive to said network management commands to increase said bandwidth of service to traffic traversing between said subscriber premises equipment and said web service by accordingly controlling a shaping and policing of traffic to and from said subscriber premises equipment.

10. The system of claim 1, wherein said service management commands direct said NMS to increase a quality of service afforded to traffic traversing to and from said subscriber premises equipment by sending, to said NAP infrastructure, said network management commands to increase said quality of service.

11. The system of claim 10, wherein said service management commands direct said increase in quality of service to traffic traversing between said subscriber premises equipment and a web service of said content provider, and wherein said NMS is responsive to said service management commands to increase said quality of service to traffic traversing between said subscriber premises equipment and said web service.

12. The system of claim 1, wherein said subscriber premises equipment comprises latent internet access facilities and said service management commands direct said NMS to provide internet access to said subscriber premises equipment by sending to said NAP infrastructure said network management commands to allow traffic to traverse between the internet and said subscriber premises equipment.

13. The system of claim 1, wherein said service request comprises directives specifying at least one of a magnitude, a type, and a duration for the change in network transport parameters for improving said network service to said subscriber premises equipment.

14. The system of claim 13, wherein said service management commands specify at least one of a magnitude, a type, and a duration for the change in network transport parameters for improving said network service to said subscriber premises equipment.

15. A method for managing network service to subscriber premises equipment associated with at least one subscriber, the method comprising:

providing, to a content provider, at least one service description for improving service of the at least one subscribe comprising:

at least one set of parameters defined for at least one IP address range for which said service is provided, the at least one set of parameters comprising a respective class of service (CoS) definition having at least one attribute selected from access BW levels, shaping levels, best effort levels, and expedited forwarding levels, content provider authorization methods, billing methods, and service API parameters; and respective filtering criteria defining which traffic said improvement applies to based on destination or source addresses of one of layer 3 and HTTP;

receiving, at a service management system, a service request from a content provider system of said content provider, said service request requesting as a service an improvement in network service to said subscriber premises equipment, wherein said service request is generated by said content provider for the at least one subscriber depending on the needs of the at least one subscriber with use of the service description;

generating service management commands with use of said service request;

sending said service management commands from said service management system to a network management system (NMS);

generating network management commands at said NMS with use of said service management commands;

sending said network management commands from said NMS to network access provider (NAP) infrastructure providing said network service to said subscriber premises equipment;

changing at said NAP infrastructure network transport parameters to increase at least one of bandwidth and quality of network access of the at least one subscriber for improving said network service to said subscriber premises equipment in response to said NAP infrastructure receiving said network management commands from said NMS; and charging said content provider for said improving of said network service to said subscriber premises equipment.

16. The method of claim 15 further comprising:

providing to said content provider said service description by publishing said service description in at least one of a private web services registry and a public web services registry.

17. The method of claim 16 wherein, said web services registries are UDDI web service databases said service description is a WSDL service description, said content provider finds said service description in said UDDI web service databases, and said service description comprises binding details to locate, contact, and invoke said service.

18. The method of claim 15, further comprising:

providing to said content provider said service description by publishing said service description directly to said content provider.

19. The method of claim 15, wherein said service request is an invocation of a service described in said service description.

20. The method of claim 19, wherein said service request is sent real-time in response to said content provider system detecting access by said subscriber premises equipment of said web service.

21. The method of claim 15, further comprising:

increasing by said NAP infrastructure bandwidth afforded to said subscriber premises equipment in response to said network management commands.

22. The method of claim 21, wherein said increasing of bandwidth afforded to said subscriber premises equipment is performed for traffic traversing between said subscriber premises equipment and a web service of said content provider.

23. The method of claim 22, wherein changing network transport parameters comprises shaping and policing of traffic to and from said subscriber premises equipment in response to said network management commands to increase said bandwidth of service to traffic traversing between said subscriber premises equipment and said web service.

24. The method of claim 15, further comprising:

increasing by said NAP infrastructure a quality of service afforded to traffic traversing to and from said subscriber premises equipment in response to said network management commands.

25. The method of claim 24, wherein said increasing of quality of service afforded to traffic traversing to and from said subscriber premises equipment is performed for traffic traversing between said subscriber premises equipment and a web service of said content provider.

26. The method of claim 15, wherein said subscriber premises equipment comprises latent internet access facilities, the method further comprising:

providing internet access by said NMS to said subscriber premises equipment by sending to said NAP infrastructure said network management commands to allow traffic to traverse between the internet and said subscriber premises equipment.

27. The method of claim 15, wherein said service request comprises directives specifying at least one of a magnitude, a type, and a duration for the change in network transport parameters for improving said network service to said subscriber premises equipment.

28. The method of claim 27, wherein said service management commands specify at least one of a magnitude, a type, and a duration for the change in network transport parameters for improving said network service to said subscriber premises equipment.

* * * * *